March 27, 1945.                C. F. KRAMER                    2,372,381
                         RECEPTACLE AND CLOSURE
                    Filed Sept. 2, 1941              2 Sheets-Sheet 1

C. F. Kramer
INVENTOR.

BY  C. C. McRae and
    Robert G. Harris

ATTORNEYS.

March 27, 1945.   C. F. KRAMER   2,372,381
RECEPTACLE AND CLOSURE
Filed Sept. 2, 1941   2 Sheets-Sheet 2
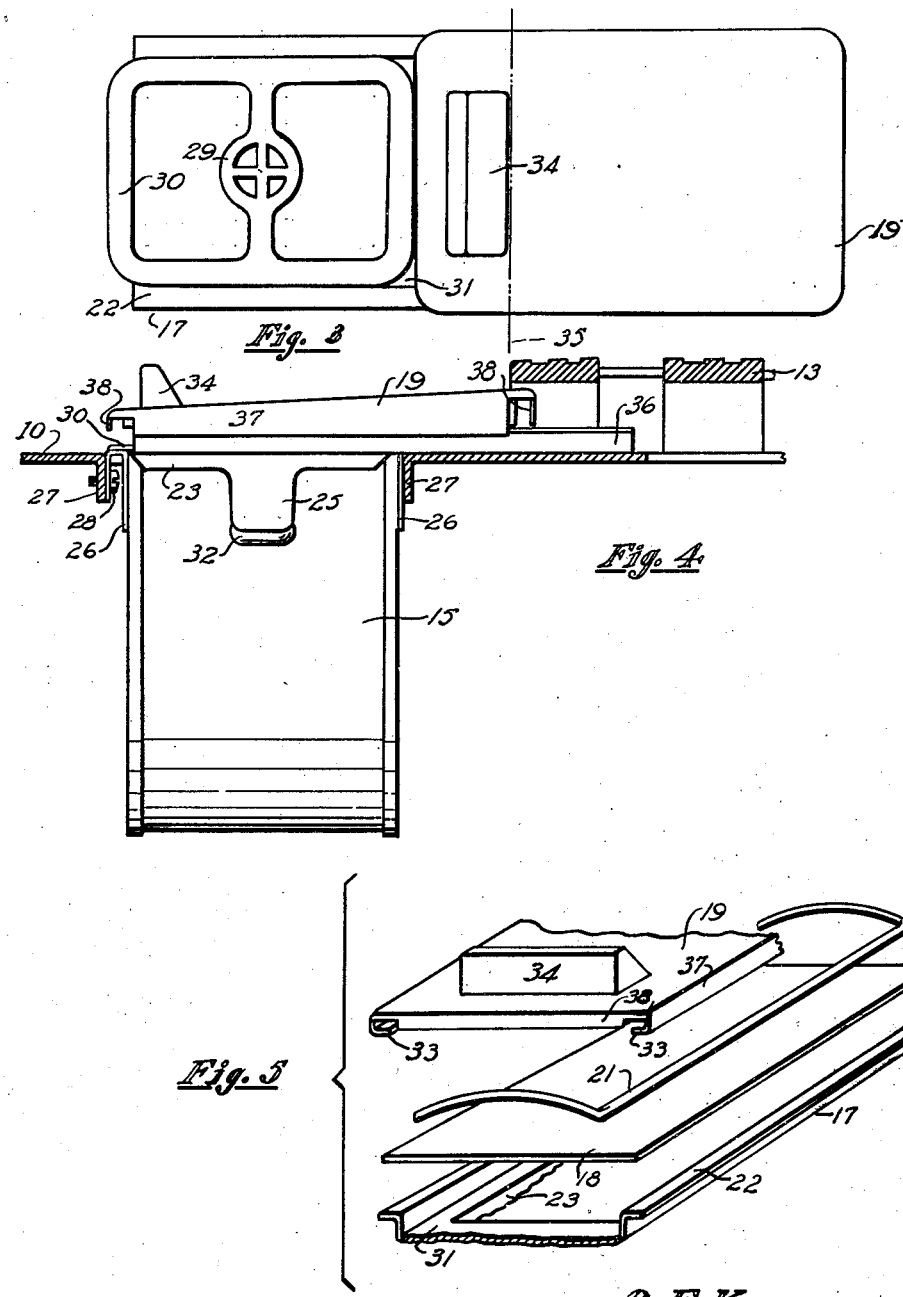
C. F. Kramer
INVENTOR.
BY E. C. McRae and
Robert G. Harris
ATTORNEYS.

Patented Mar. 27, 1945

2,372,381

UNITED STATES PATENT OFFICE 2,372,381

RECEPTACLE AND CLOSURE

Clarence F. Kramer, Birmingham, Mich., assignor to Ford Motor Company, Dearborn, Mich., a corporation of Delaware Application September 2, 1941, Serial No. 409,236

6 Claims. (Cl. 206—19.5)

This invention relates to automotive accessories; and, more particularly, to an ash receptacle or the like and a closure therefor.

An object of this invention is to provide an ash receptacle and a closure therefor which is readily opened and closed; and which will be much less expensive to manufacture than the type now generally in use. A further object of the invention is to provide a mounting means in conjunction with the instrument panel of a motor vehicle by which the receptacle may be mounted at the most advantageous point without detracting from the appearance of the interior design.

Still another object is to provide a closure which, while readily operable, is self-locking in any position in which it may be placed and is so constructed that it will not bind or catch but will remain quiet throughout the life of the vehicle.

With these and other objects in view, the invention consists in the arrangement, construction and combination of the various parts of my improved device, as described in this specification, claimed in my claims, and illustrated in the accompanying drawings, in which:

Figure 3 is a plan view of the device when open.

Figure 4 is an elevation of the device when closed.

Figure 5 is an exploded view of a modified form of the device, showing the sequence of its assembly.

Figure 1:
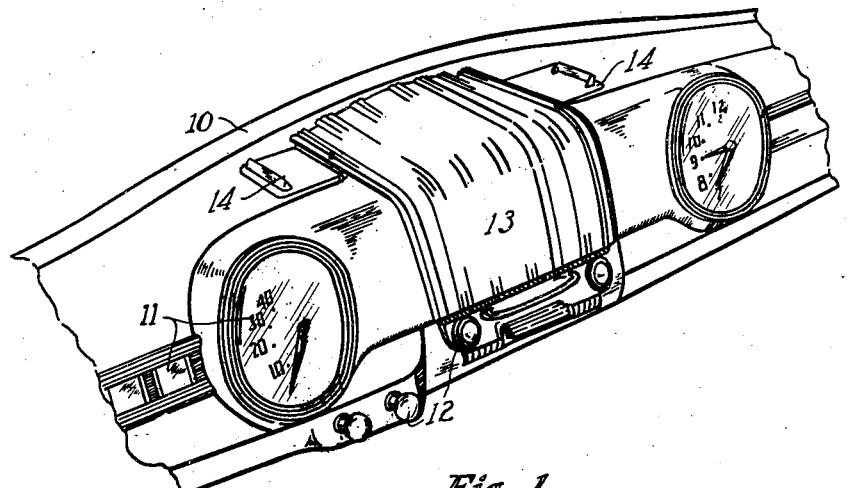
Figure 1 is a perspective view of a portion of the instrument panel of a motor vehicle showing the invention in use.

Referring now to Figure 1, the instrument panel 10 of a motor vehicle is illustrated, having the usual dials or gages 11, controls 12 and radio speaker grille 13, as well as the ash receptacles 14. The latter, as will be seen, are located on each side of the speaker grille and hence are readily accessible to the driver and the passengers in the front seat.

Figure 2:
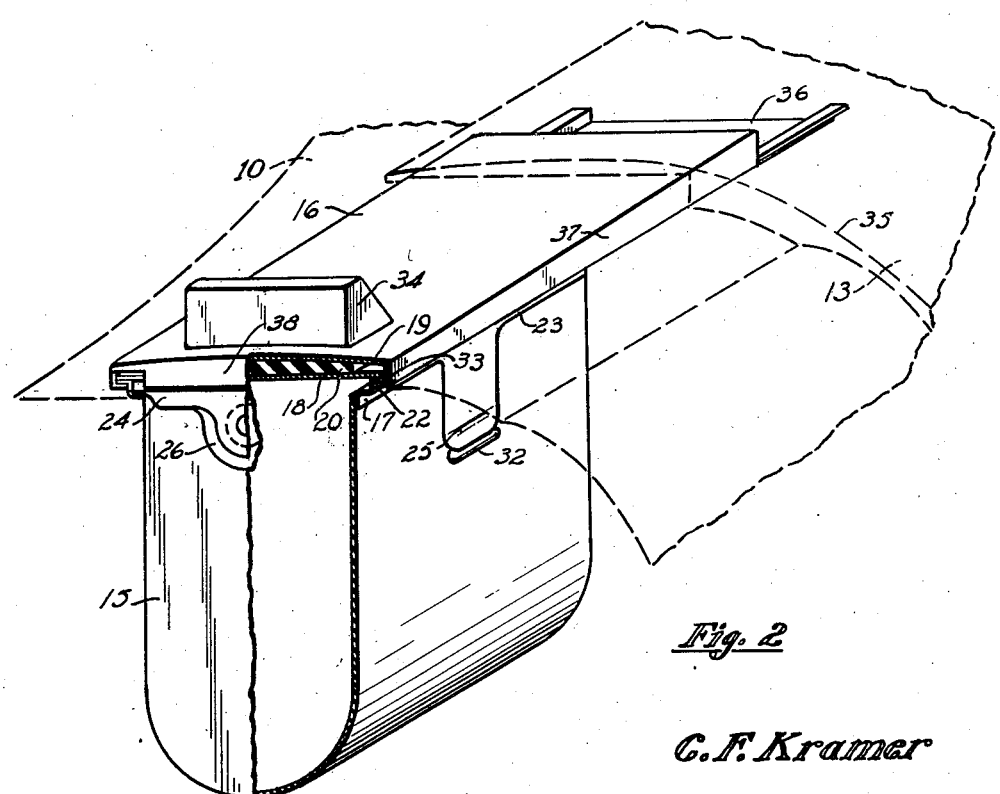
Figure 2 is an isometric view on a somewhat larger scale of the device of the invention, the remainder of the instrument panel being shown in phantom.

As best shown in Figure 2, the ash receptacle 14 includes a removable box 15 and a cover assembly indicated generally as 16. The latter, as indicated in Figure 2, or in a modification thereof in Figure 5, includes the track 17, the plate 18, the cover 19 and, interposed between the last two elements, a resilient means which in the construction of Figure 2 is a block of rubber 20 and in that of Figure 5 is a metallic spring 21.

The track 17 is preferably stamped from a rectangular metal plate which has its edges bent upwardly and then outwardly to form an angular flange 22 on either side. The center portion of the plate is then cut out and depending side flanges 23 and end flanges 24 are formed at the sides and ends. The side and end flanges 23 and 24 each have tabs 25 and 26, respectively, which are relatively resilient and which engage the box 15 when it is in position. The track 17 is mounted on top of the instrument panel 10, the latter being cut away to register with the opening defined by the depending flanges 23 and 24 of the track. The opening in the panel is preferably formed with suitable flanges such as 27 at either end by which the track structure is supported and to which it is secured as with the screw 28.

It will be noted from Figure 2 that the track 17 extends a considerable distance under the radio speaker grille 13. The reason for this arrangement is that when the cover 19 is slid to the open position it slides underneath the grille and is concealed therein, resulting in a particularly neat appearance of the instrument panel. When closed, the grille conceals the track end 36 which would otherwise be exposed. The box 15 includes a snuffer 29 of conventional form which is integral with a rim 30. The rim 30 is affixed to the box 15 and extends beyond it some distance, thereby supporting the box 15 on the flat portion 31 of the track. The opposite walls of the box are formed with small detents 32 which engage the resilient tabs 25 and by which the box is maintained in position.

The cover assembly 16 is best shown in exploded view in Figure 5 and in its normal position in Figure 2. It will be observed that the plate 18 rests upon the upper side of the flanges 22 of the track 17 and slides thereon. The cover 19 is formed with depending sides 37 having inwardly directed flanges 33 which, as best seen in Figure 2, enclose and bear against the lower side of the flanges 22. Between the plate 18 and the cover 19, a resilient body is interposed. This may be of various sorts, two being illustrated, such as the rubber block 20 in Figure 2 or the metal spring 21 in Figure 5 which may be given a thin coating of rubber to prevent noise.

The effect of this spring material is, of course, to urge the cover 19 and the plate 18 apart, by reason of which the cover flanges 33 frictionally engage the lower sides and the plate 18 engages the upper sides of the angular flanges 22 on the track. The cover is thus maintained in any particular position in which it is placed. It will be noted that the cover sides 37 are considerably deeper at the inner end than they are at the outer. This serves two purposes. First, the depth of the inner end is such that it just clears the lower edge of the grille. Thus, when shut, there appears to be a tight joint between grille and cover. However, sliding clearance is insured even if considerable manufacturing inaccuracy exists. Second, adequate spring pressure is obtained and particularly at the outer end at which the force is applied. This gives the desired friction grip without a tendency to bind. The design requires that the cover be operated from one end rather than from the center and it is for this reason that the construction has particular advantage.

As has been stated before, the track end 36 extends under the grille 13, which covers the radio speaker. When the ash receptacle is closed, the cover, as shown in Figure 4, is almost entirely outside of the grille. On the other hand, when the cover is open, it is pushed back underneath the grille until the handle 34 encounters the grille proper, as indicated in Figure 3 by the dotted line 35. In this position, the cover is clear of the rim 30 of the box, which may then be lifted out for emptying by using the snuffer 29 as a handle.

The method of assembly will be apparent from Figure 5. The cover 19 is formed with the sides 37 and the ends 38. The elements are assembled in the order shown, compressed, and slid on the track from the free end 36. Thereafter, the handle 34 limits the movement inwardly and the inner flange 38 serves the same purpose for outward movement.

It is obvious that this construction results in a particularly neat appearing receptacle which may be placed at the most advantageous point for use. The receptacle is provided with an effective cover which may be operated easily and noiselessly and which does not require the driver, when he desires to open the receptacle, to remove his attention from the road. The force required to slide the cover is surprisingly small, since the frictional resistance which ordinarily keeps the cover in place is easily overcome and there is no tendency to bind because of the differential pressure. As the construction requires only the four elements of track, plate, spring and cover, all of which may be readily formed by stamping, it is much more economical to produce than the hinged type of receptacles which are now widely used. It is also much more satisfactory than the drawer type which has been used in the past, inasmuch as there is a larger capacity; the present device is easier to open and close and will not rattle or become loose with use. While shown in a horizontal position, it is apparent that the closure might be used with a vertical cover as the friction locking feature will hold the cover against displacement in any vertical position.

I have thus devised an ash receptacle for a motor vehicle and the mounting therefor, which receptacle may be mounted unobtrusively, yet has ample capacity. Moreover, this receptacle is a closure which is positive in action but which may be operated easily and readily and which may be opened or closed or maintained at an intermediate position therebetween as desired. This closure is of an extremely economical design and quiet in operation and action.

Some changes may be made in the arrangement, construction and combination of the various parts of the improved device without departing from the spirit of the invention and it is the intention to cover by the claims such changes as may be reasonably included within the scope thereof.

I claim as my invention:

1. In combination, in a box closure, comprising, a track having angular flanges formed on opposite sides thereof, a plate slidably disposed on the upper surface of said angular flanges, a cover disposed above said plate and having depending sides, said depending sides having inwardly directed flanges engaging the underside of said angular flanges, the depending sides of said cover increasing in depth in the same direction throughout its extent and a resilient means interposed between said cover and said plate.

2. In combination, in a motor vehicle, an instrument panel, at least a portion of which is substantially horizontal, an opening in said instrument panel and a protective covering therefor, a receptacle comprising spaced tracks mounted on said panel, an aperture between said tracks registering with an aperture in said panel, said tracks having horizontally disposed guide surfaces, a box removably supported by said tracks and disposed within and concealed by said panel, a plate slidably engaging the upper face of said guide surfaces, said tracks extending beneath said protective covering, a cover having depending sides, said cover being disposed over said plate, inwardly directed flanges at the bottom of said depending sides, said flanges slidably engaging the under surface of said guide surfaces, the sides of said cover varying in depth through its extent, resilient means interposed between said plate and said cover, and means mounted on said cover and co-operating with said protective covering to limit the movement of said cover.

3. In combination, in a motor vehicle having an instrument panel at least a portion of which is substantially horizontal, a protective means covering a portion of said instrument panel and slightly spaced therefrom, an ash receptacle adjacent said means disposed beneath said instrument panel and communicating with an aperture in said panel, and a closure for said ash receptacle, said closure comprising a track mounted on said instrument panel on opposite sides of said aperture and extending under the said protective means, and a cover slidably mounted on said track and adapted to slide under said protective means to permit access to said receptacle.

4. In combination, in an ash receptacle, a support, spaced tracks mounted on said support, an aperture between said tracks in said support, a receptacle box removably supported in said aperture, said tracks including guide flanges spaced above said support, a plate slidably mounted on the upper side of said guide flanges, a cover disposed above said plate and having depending side members, said side members having inwardly directed flanges, said cover flanges slidably engaging the under side of said guide flanges, and resilient means comprising a block of rubber or like material interposed between and resiliently urging said cover and said plate apart.

5. The structure of claim 1 which is further characterized in that the resilient means interposed between said cover and said plate is a block of rubber or like material.

6. The structure of claim 1 which is further characterized in that the resilient means interposed between said cover and said plate is a metallic spring.

CLARENCE F. KRAMER.